UNITED STATES PATENT OFFICE 2,191,555

PROCESS FOR MAKING POROUS STRUCTURES

Julius F. T. Berliner, Wilmington, Del., assignor to E. I. du Pont de Nemours & Company, Wilmington, Del., a corporation of Delaware No Drawing. Application September 9, 1938, Serial No. 229,222

11 Claims. (Cl. 106—24)

This invention relates to cementitious building materials, and more particularly to porous or inflated materials of this kind.

Several methods have been proposed for inflating cementitious mixtures to produce light weight, porous building materials. A method that has been used with some degree of success is the catalytic decomposition of hydrogen peroxide incorporated in the plastic mixture, the desired porosity being obtained from the bubbles of oxygen gas evolved.

This invention has as an object an improved or inexpensive method for obtaining cementitious products including plaster or plaster-like products, and particularly wallboard and other preformed structural materials of honey-combed structure containing minute spherical cells of substantially uniform size. A further object is a process for the manufacture of porous materials of this kind in which the pore-forming gas is produced in situ in the cementitious mixture and by reactants which contribute desirable ingredients. Other objects will appear hereinafter.

These objects are accomplished by causing nitrogen gas to be liberated within the cementitious mix by interaction of an amide, e. g., urea, with nitrous acid formed in situ. The nitrous acid may conveniently be obtained by reacting an alkali or alkaline earth metal nitrite with an acid, e. g., sulfuric acid.

The following examples are illustrative of the practice of my invention in connection with calcined gypsum plasters such as employed in the manufacture of gypsum wallboard.

Example I

| | | |
|---|---|---|
| Water | c. c. | 825 |
| 10% $K_2SO_4$ | c. c. | 37.5 |
| Urea | gm. | 2.4 |
| $NaNO_2$ | gm. | 6.0 | prepare above solution and add to:
    1500 gms. gypsum plaster, slurry
and add:

| | | |
|---|---|---|
| Water | c. c. | 210 |
| 10% $H_2SO_4$ | c. c. | 40 |

The above ingredients after mixing are poured into a mold to set. After ten to fifteen minutes the plaster is set sufficiently to remove from the mold and is then allowed to dry in the usual way. This product is 20% lighter than a corresponding slab prepared with no inflating agent, and is characterized by very fine and uniform pores.

Example II

A highly porous product useful for insulation purposes, but having less strength, may be prepared in a similar manner from the following ingredients:

| | | |
|---|---|---|
| Water | c. c. | 825 |
| Urea | gm. | 9.6 |
| $NaNO_2$ | gm. | 24.0 |
| "Duponol ME" (fatty alcohol sulfate) | gm. | 1 | prepare above solution and add to:
    1500 gm. gypsum plaster, slurry
and add:

| | | |
|---|---|---|
| Water | c. c. | 90 |
| 10% $H_2SO_4$ | c. c. | 160 |

The product of the first example has a porosity of 20% and that of the second example over 50%, although these figures may be made higher by greater retention in the plaster during mixing and setting of the theoretical amounts of gas evolved.

Example III

| | | |
|---|---|---|
| Water | c. c. | 825 |
| Urea | gms. | 2.4 |
| $Ca(NO_2)_2$ | gms. | 1.91 | prepare above solution and add to:
    1500 gms. gypsum plaster, slurry
and add:

| | | |
|---|---|---|
| Water | c. c. | 210 |
| 10% $H_2SO_4$ | c. c. | 40 |

The above ingredients are mixed as in Example I. A molded slab was found to have a porosity corresponding to that of the product of Example I.

In practice the degree of porosity selected will vary depending on whether strength, or extreme lightness with high insulating value, is of primary importance. As little as 10% or less of porosity may be preferred in high strength products while insulating compositions might well be prepared with 75% or even a higher proportion of voids. Whatever figure is chosen the porosity can be controlled by proper adjustment of the amounts of nitrogen-forming reactants added to the mix, together with adjustment of the rate of set through accelerators, retarders, or temperature control.

In the manufacture of porous products from gypsum plasters requiring the addition of accelerators to improve their setting properties the method given, in which the nitrous acid which reacts with the amide is obtained from $H_2SO_4$ and an alkali metal nitrite, is particularly advantageous because the alkali metal sulfate formed acts as an accelerator for the setting process. This feature avoids the necessity for adding, or at least greatly reduces the amount of accelerator otherwise required to produce a plaster of the required setting properties.

This invention is generically applicable to all cementitious building materials which are essentially non-alkaline. Definitely alkaline materials are unsuitable since the nitrous acid itself and the acid from which it is formed must not be consumed in reaction with alkaline substances such as those present in Portland cement, aluminous cements, and lime. Calcium sulfate hemihydrate plaster and particularly wallboard made from stucco mixes, constitute the most valuable applications of the present process. Other applications of the invention are in connection with ordinary calcium sulfate plasters, in the neutral or acid cements such as oxychloride and phosphate cements used in floor construction and in other building products and in the clay mixes used in the manufacture of brick, tile, and the like.

Any amide which upon reaction with nitrous acid is capable of liberating free nitrogen may be used in the practice of this invention. Among suitable amides, in addition to urea, are thiourea, acetamide, propionamide, etc. In actual practice it is preferred to use urea, however, on the basis of its ready availability in large quantities and low cost.

The nitrous acid may be obtained by reacting any strong mineral or organic acid, e. g., sulfuric, sulfamic, hydrochloric, acetic, etc., with a nitrite, e. g., an alkali or alkaline earth metal nitrite. The type of acid and nitrite used in any one case for producing the nitrous acid are determined by the nature of the plaster employed. Thus, in plasters where the addition of accelerating salts is not needed or where it is desired to avoid introduction of extraneous salts, it is preferred to prepare the nitrous acid from calcium nitrite and sulfuric acid while in very slow setting plasters, where an accelerator is needed, it is generally preferred to use potassium nitrite and sulfuric acid.

The lower cost per unit of porosity in comparison with other methods in actual use for producing porous calcined gypsum plaster products is an important feature of the practice outlined herein. For instance, the cost of the inflating chemicals used in Example I is only about 40% of the cost of inflating to a similar extent with hydrogen peroxide.

As many apparently widely different embodiments of this invention may be made without departing from the spirit and scope thereof, it is to be understood that I do not limit myself to the specific embodiments thereof except as defined in the appended claims.

I claim:

1. In the manufacture of porous building products, the step which comprises including with essentially non-alkaline cementitious materials reactants, at least one of which is an amide, which form nitrogen gas in situ.

2. In the manufacture of porous building products, the steps which comprise incorporating urea with a mixture comprising water and essentially non-alkaline cementitious material, and reacting the urea in the mixture with nitrous acid.

3. In the manufacture of porous plaster products, the steps which comprise incorporating urea with a plaster-forming mixture comprising water and essentially non-alkaline cementitious material and reactants comprising a nitrite and an acid which yield nitrous acid.

4. In the manufacture of porous plaster products, the steps which comprise incorporating urea with a plaster-forming mixture comprising water and essentially non-alkaline cementitious material, an alkali metal nitrite, and sulfuric acid.

5. In the manufacture of porous plaster products, the steps which comprise incorporating with a plaster-forming mixture comprising water and essentially non-alkaline cementitious material, urea, sodium nitrite, and sulfuric acid.

6. In the manufacture of porous plaster products, the steps which comprise incorporating urea with a plaster-forming mixture comprising water and essentially non-alkaline cementitious material, an alkaline earth metal nitrite, and sulfuric acid.

7. In the manufacture of porous plaster products, the steps which comprise incorporating with a plaster-forming mixture comprising water and essentially non-alkaline cementitious material, urea, calcium nitrite, and sulfuric acid.

8. A composition of matter comprising a non-alkaline cementitious material, an amide, and a nitrite.

9. A process for making wallboard which comprises molding into sheet form a composition comprising essentially non-alkaline cementitious material and reactants at least one of which is an amide, which form nitrogen gas in situ.

10. A process for making wallboard which comprises molding in sheet form a mixture comprising water, essentially non-alkaline cementitious material, urea and reactants comprising a nitrite and an acid which liberate nitrous acid.

11. An article of manufacture consisting of wallboard comprising a non-alkaline cementitious material, an amide, and a nitrite.

JULIUS F. T. BERLINER.